INVENTOR.
EMMET J. DUFFY
BY Harry G. Page
ATTORNEY

Nov. 6, 1951 E. J. DUFFY 2,574,253

GENERATOR

Filed Dec. 10, 1946 2 SHEETS—SHEET 2

*INVENTOR.*
EMMET J. DUFFY
*BY* Harry C. Page
ATTORNEY

Patented Nov. 6, 1951 2,574,253

UNITED STATES PATENT OFFICE 2,574,253

GENERATOR

Emmet J. Duffy, Oak Park, Ill., assignor to Hazeltine Research, Inc., Chicago, Ill., a corporation of Illinois Application December 10, 1946, Serial No. 715,327

10 Claims. (Cl. 250—27)

Figure 1:
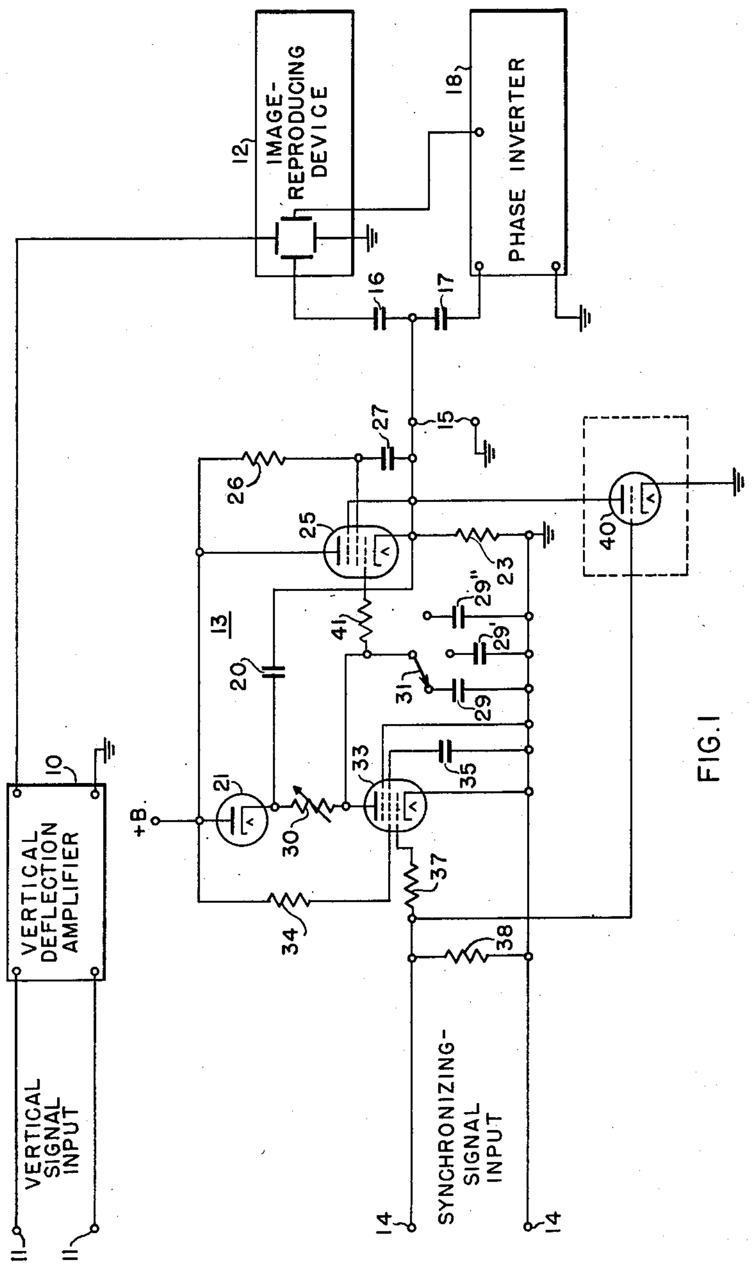

This invention is directed to arrangements for generating voltages having recurring trace and retrace portions and, particularly, to such generators wherein energy is transferred from a first energy-storage device to a second energy-storage device, the charging and discharging of the latter being effective to develop the desired voltage. An arrangement of this character has particular utility in connection with a synchroscope. Accordingly, the invention will be described in that environment.

A synchroscope is an oscilloscope having an adjustable short-duration sweep which is produced only when a synchronizing signal is applied to the input electrodes of the sweep generator associated with the horizontal deflecting plates of the cathode-ray tube. Such a device is adapted for use in investigating wave forms, measuring various electrical characteristics such as voltage, current, and phase angle, comparing unknown frequencies with known frequency standards, and for measuring short time intervals. In making some of the foregoing investigations with a synchroscope, it is sometimes necessary to alter the frequency or the duration of the sweep potential. When the sweep generators of prior synchroscopes are operated at the higher repetition rates, the durations of the trace portions of the sweep potentials and the maximum amplitude thereof undesirably diminish from their lower recurrence rate values so that, for some purposes, information of sufficient accuracy is not obtainable. This decrease in the duration and the maximum amplitude of the sweep potential is principally due to the fact that an energy-storage device or condenser in the sweep generator circuit does not, after one or more cycles of operation at a higher repetition rate, charge to a sufficiently high potential level prior to its partial discharge during the succeeding cycle of operation. Accordingly, the trace portions of sweep potentials developed at the higher repetition rates are shorter than the corresponding trace portions developed at the lower repetition rates. Consequently measurements or observations under some conditions may be inaccurate and hence not sufficiently reliable for those applications requiring a high degree of accuracy.

To avoid some of the foregoing disadvantages, it has been proposed that the condenser in the sweep generator circuit, which is alternately charged and discharged to produce the desired sweep potential, be charged from a second condenser. In the course of their operation, however, arrangements of this character exhibited the same type of disadvantages referred to above.

It is an object of the invention, therefore, to provide a new and improved arrangement for generating a voltage having recurring trace and retrace portions which avoids one or more of the above-mentioned disadvantages and limitations of prior such arrangements.

It is another object of the invention to provide a new and improved arrangement for generating a voltage having recurring trace and retrace portions wherein the trace portions have substantially identical characteristics regardless of relatively large variations in the recurrence rate thereof.

It is a further object of the invention to provide an arrangement for generating a voltage having recurring trace and retrace portions wherein the maximum amplitude of the generated voltage is substantially constant in spite of substantial variations in the recurrence rate or the duration of the trace portions.

It is an additional object of the invention to provide a new and improved arrangement for use in a synchroscope for generating sweep voltages having recurring trace and retrace portions.

In accordance with the invention, an arrangement for generating a voltage having recurring trace and retrace portions comprises a first energy-storage means and means including an impedance means for charging the first energy-storage means at least during spaced recurring intervals. The arrangement also includes a second energy-storage means and means including the above-mentioned impedance means for charging the second energy-storage means during spaced recurring intervals intermediate the first-mentioned intervals with energy supplied by the first energy-storage means to develop the trace portions of the voltage. The arrangement in accordance with the instant invention also includes means for discharging the second energy-storage means during the first-mentioned intervals to develop the retrace portions of the voltage and a device coupled to the impedance means and having a value of impedance which may be varied during the first-mentioned intervals to reduce the effective impedance value of the impedance means during the retrace portions of the voltage.

For a better understanding of the present invention, together with other and further objects thereof, reference is had to the following description taken in connection with the accompanying drawings, and its scope will be pointed out in the appended claims.

Figure 2A:
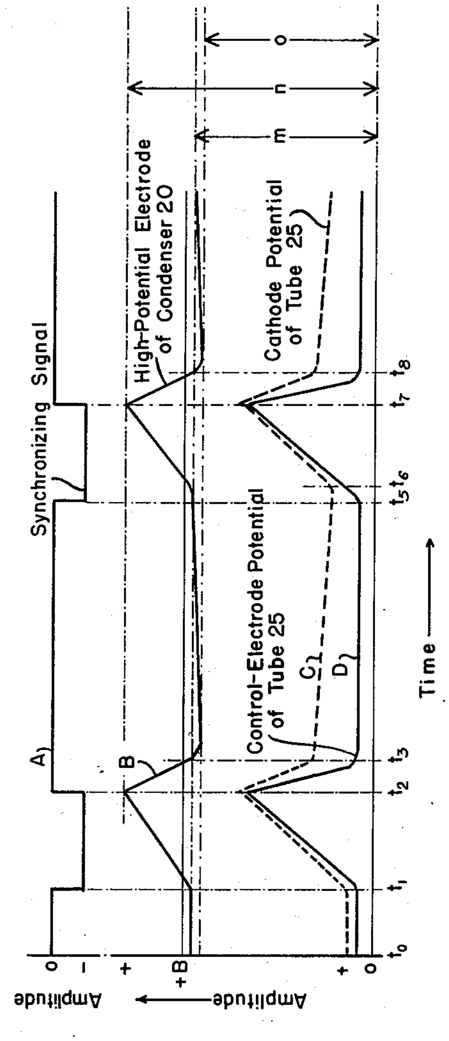
Figure 2B:
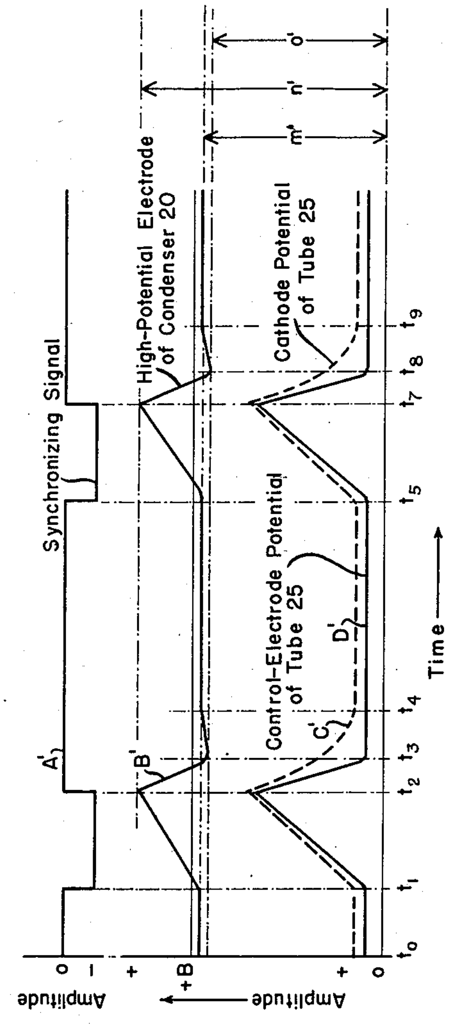

Referring now to the drawings, Fig. 1 is a circuit diagram, partly schematic, of a synchroscope including a voltage generator embodying the present invention in a preferred form; Figs. 2*a* and 2*b* comprise graphs of voltages developed in the voltage generator of Fig. 1 under different operating conditions.

Referring now more particularly to Fig. 1 of the drawings, the synchroscope there represented comprises a vertical deflection amplifier 10 including a pair of input terminals 11, 11 and an output circuit which is coupled to the vertical deflecting plates of a conventional cathode-ray type image-reproducing device 12. A voltage generator 13 for producing sweep potentials for the image-reproducing device 12 has a pair of input terminals 14, 14 and an output circuit including terminals 15, 15 which are coupled through coupling condensers 16 and 17, respectively, to one of the horizontal deflecting plates of the image-reproducing device 12 and to the input circuit of a phase inverter 18. The generator 13, which is constructed in accordance with the present invention, is shown in detail and will be described fully hereinafter. The output circuit of the phase inverter 18 is coupled to the other horizontal deflecting plate of the image-reproducing device 12.

The synchroscope of Fig. 1 as thus far described is, in general, well understood in the art so that a detailed explanation of its operation is deemed unnecessary. Briefly, however, the application of a synchronizing signal to the input terminals 14, 14 of the generator 13 causes the latter to develop at the output terminals 15, 15 a sweep potential having trace and retrace portions like those of a saw-tooth wave. This sweep potential is applied through the condenser 16 directly to one of the horizontal deflecting plates of the image-reproducing device 12 and is also applied through coupling condenser 17 to the phase inverter 18 where it is reversed in polarity. The output signal of the phase inverter 18 is applied to the other deflecting plate of the image-reproducing device 12, thus providing balanced sweep potentials for the pair of horizontal deflecting plates. These sweep potentials deflect the electron beam of the image-reproducing device 12 horizontally from left to right at a uniform rate across the fluorescent screen during the trace portions of the sweep potentials. A phenomenon under investigation, for example, the wave form of an unknown signal, is applied to the vertical signal-input terminals 11, 11 during the trace period and is amplified in unit 10. The output signal of the latter is applied to the vertical deflecting plates of the image-reproducing device 12 and is effective to deflect the electron beam vertically of the screen so that there is reproduced thereon the wave form of the phenomenon which is being studied. During the retrace interval the electron beam is returned to its original position at the left of the screen of the image-reproducing device 12, and preferably is suppressed during the retrace period in the well-known manner. After an interval of time another synchronizing signal may be applied to the terminals 14, 14 and the same or a second signal to be investigated is applied to the terminals 11, 11 of the vertical deflection amplifier 10 during the trace portions of the balanced sweep signals which are impressed on the horizontal deflecting plates of the image-reproducing device 12. The pattern of the second signal under observation is similarly traced by the electron beam before the latter returns to its original position at the left of the fluorescent screen.

Referring now more particularly to the portion of the synchroscope of Fig. 1 which embodies the present invention, the voltage generator 13 for developing a voltage having recurring trace and retrace portions comprises a first energy-storage means in the form of a condenser 20 having a relatively large capacitance. The generator also comprises means including an impedance means for charging the condenser 20 to a predetermined voltage level across its terminals. This charging circuit comprises a source of unidirectional potential +B which is connected to one terminal of the condenser 20 through a diode 21 and to the other terminal of the condenser through the aforesaid impedance means which comprises a resistor 23 having a relatively large value. The resistor 23 comprises the cathode or output resistor for a cathode-follower repeater means which includes a pentode electron tube 25. The anode of the pentode 25 is connected directly to the source +B while the screen electrode is connected thereto through a voltage-dropping resistor 26, the low-potential terminal of which is connected to the cathode through a by-pass condenser 27. The suppressor electrode is connected directly to the cathode of the pentode.

The voltage generator 13 also includes a second energy-storage means in the form of a selectable one of a plurality of condensers 29, 29', and 29'', each of which has a capacitance relatively small with respect to that of condenser 20. The capacitances of the condensers 29, 29', and 29'' are progressively larger in the order named. The generator arrangement additionally comprises means for charging any of the condensers 29, 29', or 29'' with energy supplied by the first condenser 20 to develop the trace portions of the voltage. This charging circuit includes a relatively large adjustable resistor 30, preferably having a value which is larger than that of the resistor 23, which is connected between the cathode of the diode 21 and a switch arm 31 which is adjustable for selective engagement with any of the ungrounded terminals of the last-mentioned condensers. The cathode resistor 23 is also in the last-described charging circuit since it is effective partially to determine the effective output impedance of the cathode-follower repeater 25, which constitutes a portion of this charging circuit as will be made clear subsequently. The switch arm 31 is connected to the control electrode of the pentode 25 through a resistor 41, and the high-potential terminal of the resistor 23 is connected to one of the output terminals 15.

The generator arrangement of the present invention further includes an electron-discharge means or pentode 33 which is adapted alternately to have one conductive condition and then another conductive condition. As will be made clear hereinafter, pentode 33 is effective during the aforesaid one conductive condition to discharge a desired one of the condensers 29, 29' or 29'' to develop the retrace portion of the sweep voltage. The anode of the pentode 33 is connected to the low-potential end of the resistor 30 while the cathode and suppressor electrodes are connected directly to ground. The screen electrode is connected to the source +B through a voltage-dropping resistor 34 and is by-passed to ground through a condenser 35. One input terminal 14 for the synchronizing signals is connected to the control electrode of the pentode 33 through a voltage-limiting resistor 37 while the other terminal is connected to the grounded cathode. The input circuit of the pentode 33 also includes a grid-leak resistor 38.

The sweep generator additionally includes a device in the form of a switching device having a value of impedance which may be varied for reducing the effective impedance value of the cathode resistor 23 during the retrace portions of the generator voltage. This device comprises a triode 40 having output terminals effectively connected in shunt with the resistor 23 for reducing the effective value of the resistor 23 or, more particularly, the effective output impedance of the cathode-follower repeater 25. The anode of the triode 40 is connected to the cathode of tube 25 and the cathode is grounded. The control electrode of the triode is connected to the ungrounded input terminal 14.

Considering now the operation of the described generator with reference to the graphs of Fig. 2*a* but neglecting for the moment the function of the triode 40, it will be assumed initially that at time $t_0$ pentodes 25 and 33 are conductive and that the condenser 20 is charged to a predetermined voltage between its terminals which is slightly below that of the source +B, as shown in curve B of the above-mentioned figure. During time $t_0$—$t_1$, the potential of the cathode of tube 25 is slightly higher than that of the control electrode thereof as represented, respectively, by the broken-line curve C and the full-line curve D. This potential difference is not sufficiently large to prevent the conduction of space current through the tube 25. It will also be assumed that at $t_1$ a first synchronizing signal of the type illustrated in curve A of Fig. 2*a* is applied to the input terminals 14, 14 with negative polarity with respect to the control electrode of tube 33 and that after an interval $t_2$—$t_5$ a second synchronizing signal of the same polarity is applied thereto. The interval $t_2$—$t_5$ between synchronizing signals is intended to represent a particularly short period between synchronizing signals which signifies that the sweep generator 13 is being keyed into operation at a somewhat higher repetition rate than that which provides a wholly reliable operation.

The application of the synchronizing signal at time $t_1$ alters the status of tube 33 from one conductance condition to a different conductance condition by biasing the tube beyond cutoff for the duration $t_1$—$t_2$ of the signal, thus opening the anode-cathode discharge path for the condenser 29. In response to this different operating condition of the tube 33, condenser 29 thereupon begins to charge from the condenser 20 through the resistor 30 and the resistor 23, the latter being an element in a parallel impedance combination which includes the alternating-current anode-cathode impedance of the cathode-follower tube 25. Since tube 25 is conductive during the interval $t_1$—$t_2$, the impedance presented by the resistor 23 and the space-current path of tube 25 is the effective output impedance of the cathode-follower repeater. Condenser 29 charges linearly in the manner represented by the curve D of Fig. 2*a*. As the ungrounded terminal of condenser 29 rises in potential level, this increase is applied to the control electrode of tube 25 through the resistor 41. Since tube 25 is operating as a cathode follower, a similar potential increase appears at the cathode thereof and, hence, at the output terminal 15 which is directly connected thereto. The cathode potential and the control-electrode potential tend to approach each other gradually during the interval $t_1$—$t_2$ as illustrated in the curves C and D. Hence the control electrode and the cathode of tube 25 increase in potential at almost identical rates and, since the potential across the terminals of condenser 20 remains nearly constant during the foregoing interval, the current flow through the resistor 30 and hence the charging current for the condenser 29 has a substantially constant value. Thus, the condenser 29 charges linearly and a similar output voltage is applied across the output terminals 15, 15.

During the interval $t_1$—$t_2$, the level of the low-potential electrode of the condenser 20 increases in the manner represented by the broken-line curve C since that electrode is connected directly to the cathode of the tube 25. Simultaneously therewith the high-potential electrode of the condenser 20, which is connected to the cathode of the diode 21, rises in potential from the level *m*, which is somewhat less than +B, to the level *n* which is above the +B level as shown in curve B, thus holding the diode 21 beyond cutoff. It will be observed from the slope of curves B and C during the interval $t_1$—$t_2$ that the high-potential electrode rises at a lower rate than the low-potential electrode due to the charge which is being accumulated by the condenser 29.

The synchronizing signal terminates at time $t_2$ and, since the pentode 33 is then operating without a bias, it becomes conductive, thus returning to the aforesaid one conductive condition. Condenser 29 thereupon discharges quickly and somewhat linearly through a circuit having a relatively short time constant, which circuit includes the space-current path of the pentode 33, thereby developing the retrace portion of the sweep voltage. This discharge of the condenser 29 during the interval $t_2$—$t_3$, as it affects the control electrode of the cathode follower 25, is represented by the curve D of Fig. 2*a*. The cathode potential of tube 25, however, decreases at a somewhat lower rate than that of the control electrode thereof during the interval $t_2$—$t_3$. Accordingly the cathode potential becomes sufficiently higher than that of the control electrode that tube 25 is biased beyond cutoff at about time $t_3$. Also during the interval $t_2$—$t_3$ the high-potential terminal of the condenser 20 falls from the level *n* to the level *o* which is below that of the source +B, as illustrated in curve B of Fig. 2*a*. Since the cathode of the diode 21 is now below the +B level at time $t_3$, the diode becomes conductive and the condenser 20 charges slowly as indicated in curve B until the potential across the terminals thereof again reaches the level *m* at approximately time $t_5$.

It will be observed from curves C and D that, during the interval $t_3$—$t_5$, the cathode potential of tube 25 remains considerably higher than that of the control electrode thereof. Accordingly, the pentode 25 is biased beyond cutoff during the interval $t_3$—$t_5$, so that the charging circuit for condenser 20 includes the diode 21 in series with the resistor 23. Because the latter is no longer connected in shunt relation with the conductive space-current path of the cathode-follower tube 25, the impedance between the cathode of tube 25 and ground has a high value. This is effective materially to reduce the charging rate of the condenser 20 and prevents it from being charged to its proper level *m* prior to the application of a second synchronizing signal.

At time $t_5$ a second synchronizing signal is applied to the input terminals 14, 14 of the generator 13. This signal biases the pentode 33 beyond cutoff and the condenser 20 begins to charge the condenser 29 through the resistors 30 and 23. During the interval $t_5$—$t_6$ the potential level of the cathode of the pentode 25 is still considerably higher than that of the control electrode thereof so that the tube is still in a nonconducting state. As the condenser 29 is being charged during the last-mentioned interval, the potential of the control electrode of tube 25 increases and approaches that of the cathode thereof. At time $t_6$ the potential difference between the control electrode and the cathode reaches the critical value whereupon the tube 25 becomes conductive. The increase in potential across the input terminals of tube 25 is then translated across the resistor 23 and the output terminals 15, 15 by cathode-follower action so that the second trace portion of the output voltage appears during the interval $t_6$—$t_7$ as represented by the broken-line curve C of Fig. 2*a*. The synchronizing signal terminates at time $t_7$, thus ending the trace portion and initiating the retrace portion in the manner previously explained. The control-electrode potential returns to its original value at time $t_8$ while the cathode potential decreases slowly in the manner previously mentioned in connection with the corresponding preceding intervals.

It will be observed that the second sweep potential of curve C has a foreshortened trace portion. It will therefore be apparent that a recurrent sweep signal of this character, when utilized in connection with a synchroscope or similar device, may result in the production of a very inaccurate display of information on the screen of the image-reproducing device 12. For example, information which should be displayed during the intervals $t_5$—$t_6$ will be completely absent.

Considering now the operation of the voltage generator 13 as influenced by the action of the triode 40, with reference to the graph of Fig. 2*b*, it will again be assumed that at time $t_1$ the condenser 20 has been fully charged to the level $m'$ and that tubes 25, 33, and 40 are all conductive. While the cathode of tube 25 is somewhat more positive than the control electrode thereof, it is not sufficiently positive to prevent the flow of space current. At time $t_1$ the negative synchronizing signal of curve A′ is applied to the input terminals 14, 14 and it biases tubes 33 and 40 beyond cutoff so that the condenser 20 begins to charge the condenser 29 through the resistor 30 and the effective output impedance of the cathode follower including the tube 25. While the condenser 29 increases in potential, the control electrode of tube 25 rises in potential during the interval $t_1$—$t_2$ as illustrated in curve D′. The cathode of tube 25 increases linearly in potential as illustrated in curve C′ of Fig. 2*b* for reasons which were previously explained in detail in connection with Fig. 2*a*. During the interval $t_1$—$t_2$ the potential across the terminals of condenser 20 increases from the level $m'$ to the level $n'$ as represented in curve B′ of Fig. 2*b*.

At time $t_2$ the synchronizing signal terminates and the tubes 33 and 40 again return to their normally conductive state. This permits the condenser 29 to discharge through the anode-cathode of tube 33, thus causing the control-electrode potential of tube 25 to decrease abruptly during the interval $t_2$—$t_3$ as illustrated in curve D′. The cathode potential and that of the high-potential electrode of the condenser 20 also decrease steadily although at a somewhat slower rate during the interval $t_2$—$t_3$ as represented by the curves C′ and B′, respectively. The high-potential electrode of condenser 20 falls to a level $o'$ which is below the +B level and also the level $m'$ at which the condenser is fully charged. Consequently the diode 21 becomes conductive at approximately time $t_3$ and the condenser begins to charge from the source +B. At time $t_3$ the cathode potential of tube 25 exceeds the control-electrode potential thereof by the critical value so that the tube is biased beyond cutoff. This would normally increase the cathode-to-ground impedance to a large value corresponding to that of the resistor 23 but for the action of the triode 40 which is now in a conductive state, as mentioned above. Accordingly the parallel combination of the triode 40 and the resistor 23 is effective to provide a low cathode-to-ground impedance at the cathode of tube 25 during the interval $t_3$—$t_5$ so that the potential at the aforementioned cathode quickly falls to its initial level at time $t_4$ while the condenser 20 is charged to its initial level $m'$ at approximately time $t_4$. Diode 21 then becomes nonconductive. Resistor 30, due to its relatively high value of impedance, effectively isolates the condenser 20 from the discharge path for the condenser 29 through the tube 33.

During the interval $t_4$—$t_5$ the voltage generator 13 is in the same operating condition it was in during the interval $t_0$—$t_1$. Hence, at any time during the period $t_4$—$t_5$ the generator 13 is in a position to respond to a second synchronizing signal. Consequently, when a second synchronizing signal is applied to the input terminals 14, 14 at time $t_5$, the above-described cycle of operation is repeated, thereby producing a sweep voltage having a trace portion during the interval $t_5$—$t_7$ which corresponds in duration and amplitude with the trace portion of the preceding sweep voltage at time $t_1$—$t_2$. Likewise the retrace portion during the period $t_7$—$t_9$ is of a short duration which is equal to that of the preceding retrace interval $t_2$—$t_4$.

Thus the generator 13 including the triode 40 is effective at the higher repetition rates to produce sweep voltages wherein the individual sweeps correspond in amplitude and in duration. This is most important in connection with the accurate displaying of information which may have occurred at any instant during the trace interval. It has been determined experimentally with prior arrangements which were operated at the higher repetition rates that as much as twenty to twenty-five per cent of the trace portions of the sweep potentials were unobtainable and that the sweep durations also fell in substantially the same percentage. Accordingly, the trace portions of the sweep potentials developed by the generator 13 in accordance with the instant invention do not have ineffectual regions such as that during the interval $t_5$—$t_6$ which is illustrated in Fig. 2*a* of the drawings.

It will be manifest that operation similar to that described in connection with Fig. 2*b* will result when the sweep duration is increased, as by operating the switch arm 31 to make engagement with either of the larger condensers 29′ or 29″. Hence, it is unnecessary to repeat the above explanation.

While applicant does not wish the invention to be limited to any particular structural arrangement, the following more important values are given by way of example.

Resistor 23, 33,000 ohms
Resistor 30, 118,000 ohms (maximum)
Resistor 41, 100 ohms
Condenser 20, 0.01 microfarad
Condenser 29, 35 micromicrofarads
Condenser 29′, 300 micromicrofarads
Condenser 29″, 0.00175 microfarad
Tubes 25 and 33, type 6SJ7
Tube 40, type 6SN7
+B, 400 volts
Sweep voltage amplitude, 220 volts
Sweep voltage recurrence rate, 200 to 4700 cycles per second
Duration of one period of sweep:
(1), 5 microseconds (approx.)
(2), 20 microseconds (approx.)
(3), 100 microseconds (approx.)

It will be apparent from the above description and explanation of the operation of one form of the invention, that the voltage generator of the instant invention is adapted to provide, for any particular sweep duration setting of the generator, individual sweep voltages having substantially identical characteristics despite relatively wide variations in the repetition frequency.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An arrangement for generating a voltage having recurring trace and retrace portions comprising, a first energy-storage means, means including an impedance means for charging said first energy-storage means at least during spaced recurring intervals, a second energy-storage means, means including said impedance means for charging said second energy-storage means during spaced recurring intervals intermediate said first-mentioned intervals with energy supplied by said first energy-storage means to develop said trace portions of said voltage, means for discharging said second energy-storage means during said first-mentioned intervals to develop said retrace portions of said voltage, and a device coupled to the impedance means and having a value of impedance which may be varied during the first-mentioned intervals to reduce the effective impedance value of said impedance means during said retrace portions of said voltage.

2. An arrangement for generating a voltage having recurring trace and retrace portions comprising, a first energy-storage means, means including an impedance means for charging said first energy-storage means at least during spaced recurring intervals, a small energy-storage means having a storage value small relative to that of said first energy-storage means, means including said impedance means for charging said second energy-storage means during spaced recurring intervals intermediate said first-mentioned intervals with energy supplied by said first energy-storage means to develop said trace portions of said voltage, means for discharging said second energy-storage means during said first-mentioned intervals to develop said retrace portions of said voltage, and an electron tube coupled in shunt with said impedance means and having a value of impedance which is varied during said first-mentioned intervals to reduce the effective impedance value of said impedance means during said retrace portions of said voltage.

3. An arrangement for generating a voltage having recurring trace and retrace portions comprising: a first condenser; means including an impedance means for charging said first condenser to a predetermined voltage level at least during spaced recurring intervals; a second condenser; means including said impedance means for charging said second condenser during spaced recurring intervals intermediate said first-mentioned intervals with energy supplied by said first condenser to develop said trace portions of said voltage which charging tends to reduce the voltage level across said first condenser below said predetermined level; means for discharging said second condenser during said first-mentioned intervals to develop said retrace portions of said voltage; and an electron tube coupled in shunt with said impedance means and having a value of impedance which is varied during said first-mentioned intervals to reduce the effective impedance value of said impedance means during said retrace portions of said voltage so that the voltage level across said first condenser is restored substantially to said predetermined level during said retrace portions of said voltage.

4. An arrangement for generating a voltage having recurring trace and retrace portions comprising, a first energy-storage means, means including an impedance means for charging said first energy-storage means, a second energy-storage means, an electron tube, means including the parallel combination of the alternating-current conductive anode-cathode impedance of said electron tube and said impedance means for charging said second energy-storage means with energy supplied by said first energy-storage means to develop said trace portions of said voltage, means for discharging said second energy-storage means to develop said retrace portions of said voltage, and a device having a value of impedance which is varied to reduce the effective impedance value of said impedance means during said retrace portions of said voltage.

5. An arrangement for generating a voltage have recurring trace and retrace portions comprising, a first energy-storage means, an electron tube, means including a cathode impedance means for said electron tube for charging said first energy-storage means, a second energy-storage means, means effectively including the space-current path of said electron tube and said cathode impedance means for charging said second energy-storage means with energy supplied by said first energy-storage means to develop said trace portions of said voltage, means for discharging said second energy-storage means to develop said retrace portions of said voltage, and a device having a value of impedance which is varied to reduce the effective impedance value of said cathode impedance means and said space-current path during said retrace portions of said voltage.

6. An arrangement for generating a voltage having recurring trace and retrace portions comprising, a first energy-storage means, means including an impedance means for charging said first energy-storage means, a second energy-storage means, electron-tube repeating means having an input circuit connected across said second energy-storage means and including said impedance means in the cathode circuit of said repeating means for charging said second energy-storage means with energy supplied by said first energy-storage means to develop said trace portions of said voltage, means for discharging said second energy-storage means to develop said retrace portions of said voltage, and a device having a value of impedance which is varied to reduce the effective impedance value of said impedance means during said retrace portions of said voltage.

7. An arrangement for generating a voltage having recurring trace and retrace portions comprising, a first energy-storage means, a cathode-follower impedance means, means including said impedance means for charging said first energy-storage means, a second energy-storage means, means including the effective output impedance of said impedance means for charging said second energy-storage means linearly with energy supplied by said first energy-storage means to develop said trace portions of said voltage, switching means for discharging said second energy-storage means to develop said retrace portions of said voltage, and a device connected in shunt relation with said impedance and having a value of impedance which is effective to reduce the effective output impedance of said impedance means during said retrace portions of said voltage.

8. An arrangement for generating a voltage having recurring trace and retrace portions comprising, a first energy-storage means, electron-discharge means, means including an impedance means and responsive to one conductance condition of said electron-discharge means for charging said first energy-storage means, a second energy-storage means, means including said impedance means and responsive to a different conductance condition of said electron-discharge means for charging said second energy-storage means with energy supplied by said first energy-storage means to develop said trace portions of said voltage, said electron-discharge means being effective during said one conductance condition thereof to discharge said second energy-storage means to develop said retrace portions of said voltage, and a device having a value of impedance which is varied to reduce the effective impedance of said impedance means during said one conductance condition of said electron-discharge means to accelerate the charging of said first energy-storage means during said retrace portions of said voltage.

9. An arrangement for generating a voltage having recurring trace and retrace portions comprising, a first energy-storage means, electron-discharge means normally having one conductance condition and having a different conductance condition in response to a control effect applied thereto, means including an impedance means responsive to said one conductance condition of said electron-discharge means for charging said first energy-storage means, a second energy-storage means, means including said impedance means responsive to said different conductance condition of said electron-discharge means for charging said second energy-storage means with energy supplied by said first energy-storage means to develop said trace portions of said voltage, said electron-discharge means being effective during said one conductance condition thereof to discharge said second energy-storage means to develop said retrace portions of said voltage, and a device having a value of impedance which may be varied and responsive to said control effect and rendered inoperative thereby during said trace portions of said voltage but normally operative during said retrace portions of said voltage for reducing the effective impedance of said impedance means to accelerate the discharging of said first energy-storage means during said retrace portions of said voltage.

10. An arrangement for generating a voltage having recurring trace and retrace portions comprising, a relatively large energy-storage means, electron-discharge means normally having one conductance condition, means in the space-current path of said electron-discharge means and responsive to a control effect for imparting to said electron-discharge means a different conductance condition, cathode-follower repeating means, means including cathode impedance means for said repeating means and responsive to said one conductance condition of said electron-discharge means for charging said relatively large energy-storage means, a relatively small energy-storage means, means including the effective output impedance of said repeating means and responsive to said different conductance condition of said electron-discharge means for charging said relatively small energy-storage means with energy supplied by said relatively large energy-storage means to develop said trace portions of said voltage, said electron-discharge means being effective during said one conductance condition thereof to discharge said relatively small energy-storage means to develop said retrace portions of said voltage, and a triode electron tube in shunt relation with said cathode impedance means and responsive to said control effect and rendered inoperative thereby during said trace portions of said voltage but normally operative during said retrace portions of said voltage for reducing the effective output impedance of said repeating means during said retrace portions of said voltage to accelerate the charging of said relatively large energy-storage means during said retrace portions of said voltage.

EMMET J. DUFFY.

REFERENCES CITED

The following references are of record in the file of this patent:

UNITED STATES PATENTS

| Number | Name | Date |
|---|---|---|
| 2,113,011 | White | Apr. 5, 1938 |
| 2,426,256 | Zenor | Aug. 26, 1947 |
| 2,436,890 | Higinbotham | Mar. 2, 1948 |